UNITED STATES PATENT OFFICE.

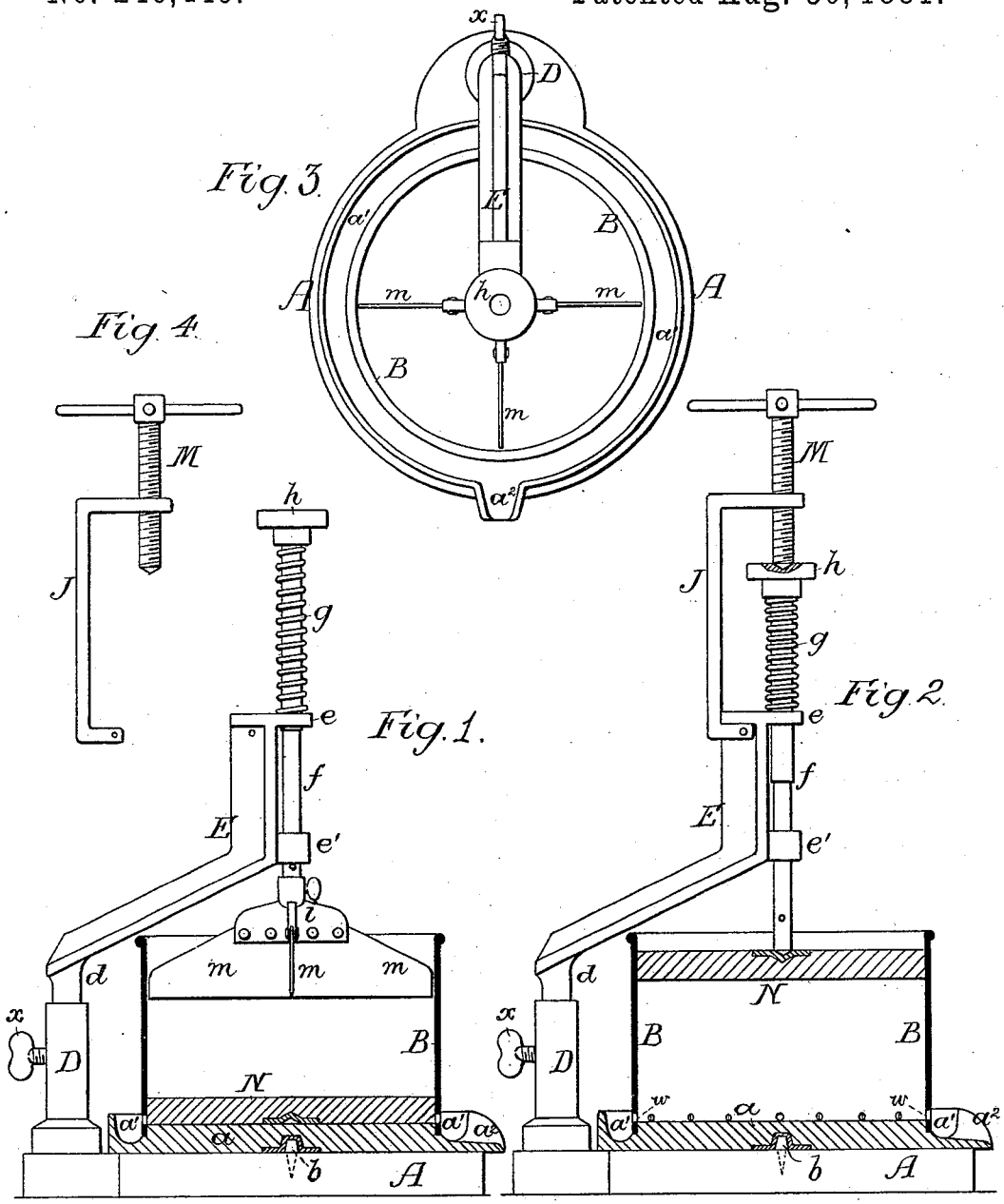

GEORGE H. BACKMIRE, OF PHILADELPHIA, PENNSYLVANIA, ASSIGNOR OF ONE-HALF TO HENRY R. SHOCH, OF SAME PLACE.

COMBINED FRUIT-PRESS AND CHOPPER.

SPECIFICATION forming part of Letters Patent No. 246,449, dated August 30, 1881.

Application filed July 20, 1881. (No model.)

*To all whom it may concern:*

Be it known that I, GEORGE H. BACKMIRE, a citizen of the United States, residing in Philadelphia, Pennsylvania, have invented a Combined Fruit-Press and Chopper, of which the following is a specification.

The object of my invention is to construct a device which can be used either for extracting juices from berries or fruit or for chopping meat or vegetables, and this object I attain in the manner which I will now proceed to describe, reference being had to the accompanying drawings, in which—

Figure 1 is a side view, partly in section, of the device adapted for chopping; Fig. 2, the same, showing the device adapted for pressing; Fig. 3, a plan view of Fig. 1, and Fig. 4 a detached view of part of the device.

A is a base or platform, adapted for the support of a receptacle, B, the bottom $a$ of the latter projecting beyond the sides of the receptacle, and being provided with a groove or channel, $a'$, and discharge-spout $a^2$. The receptacle B is maintained in a central position on the base A by means of a pin or projection, $b$, on the latter, adapted to a socket in the under side of the bottom $a$.

At the rear of the base A is a tubular standard, D, to which is adapted the stem $d$ of a frame, E, the latter projecting over the receptacle B, and having in line with the center of said receptacle bearings $e$ $e'$ for a rod, $f$. A spiral spring, $g$, is interposed between the upper bearing, $e$, and a knob, $h$, at the top of the rod $f$, and this spring tends to elevate the rod, which, however, is free to turn in its bearings, and can be depressed by pressure upon the knob $h$. As shown in Fig. 1, the lower end of the rod $f$ carries a frame, $i$, furnished with radial knives $m$, so that as the rod $f$ is reciprocated and turned in its bearings the meat or vegetables deposited in the receptacle B will be cut or minced. When the operation is concluded the frame E is elevated until the knives $m$ are free from the receptacle B, the frame being then swung to one side, so as to permit the removal of the minced meat or vegetables from the receptacle.

When it is desired to use the device as a press for extracting juices from berries, fruit, &c., the knife-frame is removed from the lower end of the rod $f$, and a yoke, J, is secured, by a pin or otherwise, to the upper end of the frame E, as shown in Fig. 2. The yoke J carries a screw-rod, M, which, when said yoke is adjusted to the position shown in Fig. 2, bears upon the knob $h$ of the rod $f$ and serves as a means of depressing the same, so that its lower end will act upon a plunger, N, placed on top of the berries or fruit in the receptacle B, and will impart such pressure to the plunger that the juice will be expressed from the berries or fruit, and will flow through perforations $w$ in the sides of the receptacle into the annular channel or trough $a'$ in the bottom $a$, and will be discharged therefrom into any suitable vessel through the spout $a^2$.

In the present instance I utilize the plunger N as a false bottom for the receptacle B when meat or vegetables are being minced, so that at such times the perforations $w$ are covered and the clogging of the same is prevented.

The frame E is retained in any position to which it may be adjusted in the tubular standard D of the base A by a set-screw, $x$, which acts upon the stem $d$ of said frame.

Instead of being detachable, the yoke J may be hinged to the frame E, so as to be thrown back out of the way when its use is not required; but the detachable yoke is preferred.

I claim as my invention—

1. The combination of the base A, a receptacle, B, a frame, E, a rod, $f$, adapted for actuating either a knife-carrying frame or a plunger, and a movable or detachable yoke, J, having a screw-stem, M, for acting on the rod $f$, as set forth.

2. The combination of the base A, the receptacle B, the frame E, the rod $f$, adapted to both reciprocate and turn in bearings on said frame E, the knife-carrying frame on said rod, and the spring $g$, adapted to elevate the rod, as set forth.

3. The combination of the base A, having a tubular standard, D, the receptacle B, and the frame E, carrying the operating-rod $f$, and having a stem, $d$, adapted to said tubular standard, as set forth.

4. The combination of the receptacle B, having perforations $w$, with a false bottom, N, adapted to form a plunger, as set forth.

5. The combination of a receptacle, a frame carrying a rod which reciprocates vertically in bearings on the frame, and a yoke having a screw-stem adapted to act upon the rod, which is free to be operated independently of said screw-stem, as set forth.

In testimony whereof I have signed my name to this specification in the presence of two subscribing witnesses.

GEO. H. BACKMIRE.

Witnesses:
HARRY DRURY,
HARRY SMITH.